March 2, 1965        J. L. HELSING        3,171,438
VALVE
Filed Aug. 14, 1962
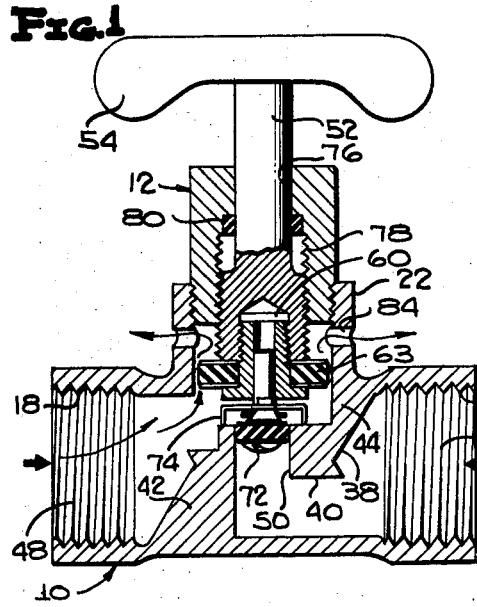
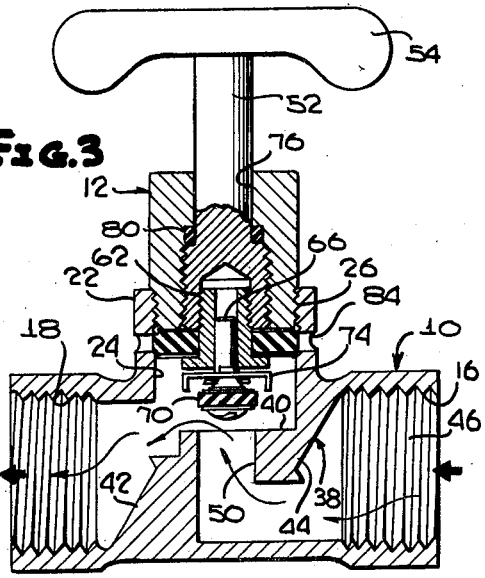
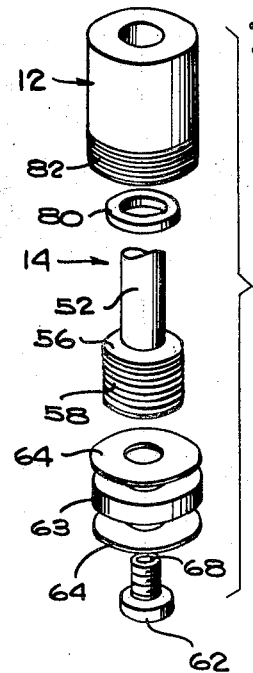
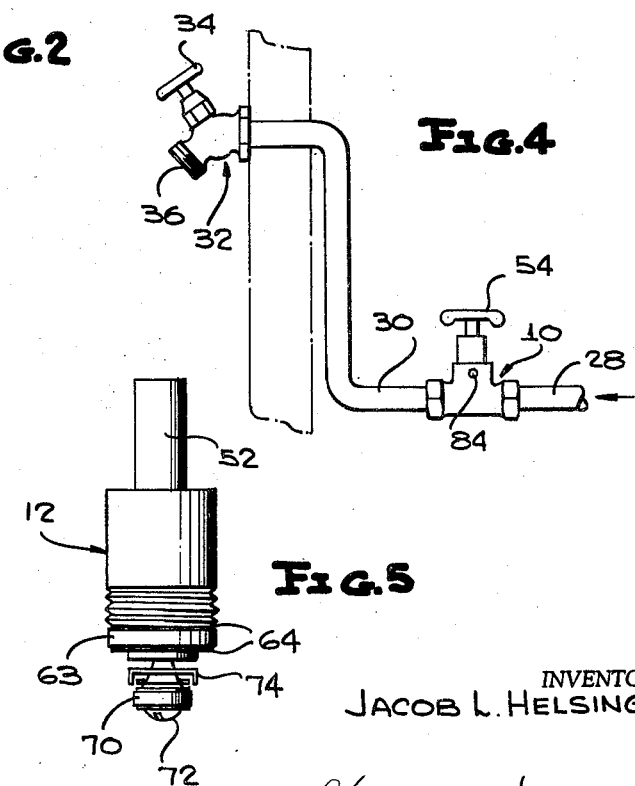
INVENTOR
JACOB L. HELSING
BY *Shoemaker and Mattare*
ATTORNEYS

United States Patent Office

3,171,438
Patented Mar. 2, 1965

3,171,438
VALVE
Jacob L. Helsing, 608 N. Winnetka, Dallas 8, Tex.
Filed Aug. 14, 1962, Ser. No. 216,816
6 Claims. (Cl. 137—625.26)

This invention relates to a plumbing item and more particularly to a cut-off valve connected between an inlet conduit and an outlet conduit which is provided with means to automatically vent the outlet conduit when the valve is closed to prevent flow between the inlet and outlet conduits.

In conventional homes, it is common practise to provide a cut-off valve in the plumbing system of the home that is located within the structural walls of the home and connected inlet and outlet conduits or pipes. The outlet pipe extends between the cut-off valve and an outlet valve which is normally located exteriorly of the home. Normally, the cut-off valve is left in an open position and water is drained from the outlet pipe as desired by opening and closing the outlet valve at the end of the outlet pipe. However, in certain instances it is desirable to drain the water from the outlet pipe to prevent it from freezing and possibly bursting the pipe. Also, it is desirable to drain the outlet pipe at times for other purposes such as when it is necessary to replace or repair the outlet valve. Normally, the draining of the outlet pipe is accomplished by closing the cut-off valve and opening the outlet valve. However, it is often impossible to drain the outlet pipe because conventional cut-off valves are not provided with vent means to permit air to replace the water drained from the outlet valve and therefore atmospheric pressure prevents the outlet pipe from draining. Accordingly, it is a primary object of this invention to provide an improved cut-off valve which will automatically vent the outlet pipe to which it is connected whenever it is closed whereby the outlet pipe may be readily drained providing the end of the outlet pipe is not closed.

It is another object of the invention to provide a cut-off valve which is of simple construction, long lasting in use, and therefore may be maintained and manufactured at a minimum of expense.

It is yet another object of the invention to provide a vented cut-off valve which is extremely reliable in operation.

It is yet another object of the invention to provide a cut-off valve having vent means therein which is automatically opened for venting the outlet of the valve when the valve is closed, and which vent is automatically closed when the valve is opened.

It is another object of the invention to provide a cut-off valve which is composed of materials which are highly resistant to rust or corrosion and wear, as brass, stainless steel and neoprene rubber.

It is yet another object of the invention to provide a novel valve structure having a housing composed of two separable parts whereby the valve may be readily disassembled for easily and economically replacing the working parts thereof.

It is another object of the invention to provide a valve having non-corrosive valve elements thereby preventing the valve from becoming frozen in any one position due to corrosion.

These, together with other objects and advantages which will become subsequently apparent, reside in the details of construction and operation as more fully hereinafter described and claimed, reference being had to the accompanying drawings forming a part hereof, wherein like reference numerals refer to like parts throughout, and in which:

FIG. 1 is a vertical cross-sectional view taken through the center of the valve showing it in closed position with the vent thereof open;

FIG. 2 is an exploded perspective view of a portion of the valve;

FIG. 3 is a view similar to FIG. 1 showing the valve in open position with the vent thereof closed;

FIG. 4 is a front elevational view of a valve showing it connected to an outlet faucet or valve;

FIG. 5 is a vertical elevational view showing the parts in FIG. 2 in assembled relationship.

Referring to the drawings, it can be seen that the valve comprises a valve body 10, a stem housing 12 and a valve operating assembly 14.

The valve body 10 comprises a tubular member having an axial passage therethrough of circular cross section and the ends of the passage are provided with conventional threads 16 and 18. The tubular member 20 of the valve body is secured at its upper central portion to a hollow collar 22 which also has a cylindrical passage 24 extending therethrough and communicating with the cylindrical passage through the tubular member 20. The upper end of the passage 24 is provided with threads 26.

A water supply pipe 28 has its exhaust end extending into the inlet end of the valve body 12 and the pipe is provided with threads which mate with the threads 16. An outlet pipe 30 has its inlet end extending into the exhaust end of the valve body 10 and is provided with threads which mate with the threads 18. The outlet end of the outlet pipe 30 may communicate with an outlet valve or faucet 32 of conventional design which is provided with an operating handle 34 and an outlet nozzle 36.

As shown in FIGS. 1 and 3, a partition 38 extends generally diagonally across the central portion of the passage through the valve body 10. The partition 38 comprises a horizontal valve seat 40 in axial alignment with the center of the passage 24. The partition also includes two generally semi-circular valve seat supports 42 and 44 integrally connected to each end of the partition 40 and the inner surfaces of the bore through the valve body 10. The partition 38 divides the passage through the valve body into an inlet chamber 46 and an outlet chamber 48. The valve seat 40 is provided with a circular bore 50 coaxial with the cylindrical passage 24.

The valve operating assembly 14 includes a cylindrical control stem 52 whose upper end is connected to the center of a control handle 54, and whose lower end is enlarged to form a head 56 which is provided with external threads 58 and a central bore 60 whose cylindrical surfaces are also provided with threads.

A hollow screw 62 is threaded into the bore 60. However, before the screw is installed in the bore, the shank thereof is inserted through an annular rubber seal 63 and two metal washers 64 on opposite sides of the seal. The screw 62 is threaded into the bore 60 so that the inner periphery of the rubber seal is slightly compressed between the metal washers 64.

The cylindrical shank of a stud 66 is press fitted within the bore 68 extending axially through the center of the screw 62. Of course, the stud 66 may be connected through the screw by other means such as threads or welding. A circular collar rubber valve element 70 is secured to the lower end of the stud 66 by conventional means such as a screw 72 extending through the center of the valve element 70 and threaded into the stud 66. Also attached to the lower end of the stud 66 directly above the valve element 70 is a spider 74 comprising a plurality of arms extending radially outwardly of the stud and having outer ends deflected downwardly towards the valve seat 40.

The lower end of the valve assembly 14 is contained within the collar 22 as illustrated in FIGS. 1 and 3. The valve assembly is maintained in proper position by the stem housing 12. The control stem 52 extends through a bore 76 through the stem housing and it is journalled therein. The lower end of the bore is enlarged and provided with internal threads 78 which mate with the threads 58 on the head 56. The upper end of the enlarged portion of the bore 76 is provided with an annular seal 80 preferably formed of rubber and compressed between the stem 52 and the bore 76. The outer surface of the stem housing 12 is provided with threads 82 which mate with the threads 26 in the collar 22 for maintaining the various parts of the valve in assembled relationship.

The collar 22 is provided with a plurality of coplanar radial bores 84 which are directly below the end of the stem housing 12. The diameters of the seal 63 and washer 64 are slightly smaller than the diameter of the cylindrical passage 24 so as to provide an annular passage between the radial bores 84 and outlet chamber 48.

In operation, the outlet valve is normally maintained in the open position illustrated in FIG. 3. The valve is opened in an obvious manner by rotating the control handle 54 whereby the stem 52 screws upwardly within the thread 78 thereby lifting the valve element 70 above the valve seat 40 so as to open the passage 50 between the chambers 46 and 48 and to move the upper washer 64 into abutment with the lower end of the stem housing 12. The stem 52 is rotated sufficiently to force the upper washer 64 tightly against the stem housing 12 whereby the washer is moved away from and downwardly in relation to the lower end of the stem head 56 thereby compressing the rubber seal 63 between the two washers 64 so that the seal is expanded in a radial direction tightly into engagement with the vent ports or bores 84 for sealing same. The washer in the pipe 28 is then free to flow through the inlet chamber 46, the bore 50, the outlet chamber 48, through the pipe 30 and to the outlet valve 32. When it is desired to withdraw water from the pipe 30, the valve handle 34 of the outlet valve 32 is rotated so as to open the valve whereby water may flow freely through the nozzle 36. Normally, the cut-off valve 10 is used only two or three times a year or less. For example, since the cut-off valve is normally enclosed within a building structure and the outlet valve 32 is of the exterior of the building structure, in the winter-time it is desirable to drain the outlet pipe 30 so as to prevent the water therein from freezing and bursting the pipe. This is accomplished by closing the cut-off valve to the position illustrated in FIG. 1. When the cut-off valve is moved to the closed position illustrated in FIG. 1, the valve element 70 extends into the bore 50 thereby closing same and the seal 63 is moved downwardly out of alignment with the outlet or vent bores 84. Of course, when the seal 63 is moved away from the stem housing 12, it is decompressed and thereby expands in an axial direction and contracts in a radial direction thereby permitting the water within the pipe 70 to flow by the periphery of the seal and out of the bores 84 for effectively draining the outlet pipe 30. When the cut-off valve is fully closed, the ends of the spider 74 contact the upper surface of seat 40 thereby providing a limit stop for the valve. Of course, if the outlet valve 32 is below the cut-off valve then the water in pipe 30 will flow out of the outlet valve when it is opened and the pipe 30 will be vented by the bores 84 when the cut-off valve is closed. It is also to be noted that in order to drain the pipe 30, it is not only necessary to close the valve 10 but it is also necessary to open the valve 32. Thus, the water can always drain from one end of the pipe 30 while the other end of the pipe is vented. Since conventional cut-off valves have no vent means, it is virtually impossible to drain the outlet pipe between the cut-off valve and the outlet valve since atmospheric pressure maintains the water within the outlet pipe and prevents draining thereof.

Of course, the cut-off valve could be used without the outlet valve 32 whereby the outlet pipe 30 would always be automatically drained and vented when the cut-off valve is closed. The cut-off valve disclosed above also has many other uses such as, for example, it may be used as a cut-off valve in a lavatory or bathtub plumbing system.

The foregoing is considered as illustrative only of the principles of the invention. However, since numerous modifications and changes will readily occur to those skilled in the art, it is not desired to limit the invention to the exact construction and operation shown and described, and accordingly all suitable modifications and improvements may be resorted to, falling within the scope of the appended claims.

I claim:

1. A valve comprising a housing having a flow passage therethrough, a partition extending across said flow passage and having a port therethrough, said housing including a collar having interior wall surfaces defining a chamber communicating with said passage and in alignment with said port, said collar having a vent port therethrough communicating with said chamber, a hollow sleeve extending into said chamber and secured to said collar, a valve stem journalled in said hollow sleeve, mating thread means on the exterior of said stem and the interior of said sleeve for causing said stem to move into said chamber when it is rotated relative to said collar, a screw in said chamber threaded into one end of said stem and including a head spaced from said one end, a pair of rigid washers and a compressible washer of rubber-like material sandwiched between said rigid washers, all said washers being of substantially the same diameter and slidably mounted on said screw between said head and said one end of said stem, at least a portion of said washers being spaced from said wall surfaces so that fluid may flow therebetween to and from said vent port and said passage, one of said rigid washers being engageable with one end of said sleeve so as to move it towards said other rigid washer and compress said compressible washer therebetween thereby causing said compressible washer to expand radially into sealing engagement with said interior wall surfaces and prevent said vent port from venting said flow passage, a valve member mounted on said screw and movable by said valve stem into sealing relation with said port.

2. A valve as defined in claim 1 wherein said screw has a recess therein, a stud press fitted into said recess and secured to said valve member.

3. A valve as defined in claim 2 including a second screw threaded into one end of said stud and securing said valve member thereto, said valve member adapted to be moved by said valve stem into said port, a spider secured to said stud between said valve member and said first mentioned screw, said spider including a plurality of arms extending radially from said stud and having outer end portions deflected downwardly toward said partition so as to engage same and limit movement of said valve member into said port.

4. A valve comprising a housing having a flow passage therethrough, a partition extending across said flow passage and having a port therethrough, said housing including a collar having interior wall surfaces defining a chamber communicating with said passage and in alignment with said port, said collar having a vent port therethrough communicating with said chamber, a hollow sleeve secured to said collar and communicating with said chamber, a valve stem journalled in said hollow sleeve, mating cam means on the exterior of said stem and the interior of said sleeve for causing said stem to move into and out of said chamber when it is rotated relative to said collar, a screw in said chamber secured to one end of said stem and including a head spaced from said one end, a rigid washer and a compressible washer of rubber like material adjacent said rigid washer, both said washers being of substantially the same diameter and slidably mounted on said screw between said head and said one end of said stem, at least a portion of said washers being spaced from said wall surfaces so that fluid may flow therebetween to and from said vent port and said passage, said compressible washer being positioned between one end of said sleeve and said rigid washer and thereby being compressed between said one end of said sleeve and said rigid washer when said valve stem is moved out of said chamber thereby causing said compressible washer to expand radially into sealing engagement with said interior wall surfaces and prevent said vent port from venting said flow passage, a valve member mounted on said screw and movable by said valve stem into sealing relation with said port.

5. A valve comprising a housing having a flow passage therethrough terminating in spaced ends, partition means extending across said flow passage and dividing it into an inlet passage and an outlet passage, said partition having a valve port therethrough for connecting said inlet and outlet passages, said housing having inner surfaces defining a chamber, abutment means at one end of said chamber and a vent port through said housing connecting said one end of said chamber to the exterior of said housing, the other end of said chamber communicating with said outlet passage, a valve stem having an inner end portion extending into said chamber, a main valve member mounted on said inner end portion, compressible vent valve means mounted on said inner end portion between said main valve member and said abutment means and having a peripheral surface normally spaced from said chamber surface, means movably mounting said valve stem on said housing so that said stem may be selectively moved to a closing position wherein said valve member is in sealing relation with said valve port and said vent valve means is spaced from said abutment, and to a vent closed position wherein said valve member opens said port and said vent valve means is compressed against said abutment so as to cause expansion of said peripheral surface of said vent valve means into engagement with the inner surfaces of said chamber and prevent venting of said outlet passage through said vent port, said compressible vent valve means when said stem is in said closing position being compressible by surge of pressure in said outlet passage so as to reduce the spacing between the peripheral surface of said vent valve means and said chamber surfaces and thereby reduce the rate of flow of fluid through said vent port.

6. A valve comprising an elongated housing having an axial flow passage extending therethrough, a partition extending diagonally across a central portion of said flow passage and dividing said flow passage into an outlet passage and an inlet passage, a valve port extending through said partition so as to connect said outlet passage and said inlet passage and having an axis perpendicular to said flow passage, a collar integrlly secured to a central portion of said housing and having a vent chamber therein defined by cylindrical wall surfaces coaxial with said valve port, said vent chamber communicating with said outlet passage, a cylindrical valve bonnet threaded within an outer end of said collar so as to close said chamber, said bonnet having an inner end surface extending radially of said chamber and defining an abutment, a valve stem extending coaxially through said bonnet and having an inner end within said vent chamber, thread means connecting the exterior of said valve stem to the interior of said bonnet whereby rotation of said valve stem relative to said bonnet will cause said valve stem to move towards and away from said valve port, said collar having vent passages therethrough parallel to said axial flow passage communicating with said vent chamber and the exterior of said valve housing, said vent passages located closely adjacent said abutment, a screw threaded into the inner end of said valve stem and having a head spaced from the inner end of said valve stem, a compressible rubber washer sandwiched between a pair of rigid washers, all said washers slidably mounted on said screw between said screw head and the inner end of said valve stem, the peripheral surfaces of said washers being slightly spaced from the cylindrical wall surfaces defining said vent chamber, said rubber washer being of sufficient thickness so that when one of said rigid washers contacts said abutment, said rubber washer will be compressed between said rigid washers so as to cause said rubber washer to expand radially into engagement with said cylindrical wall surfaces of said chamber and seal said vent passages, the other rigid washer being exposed to fluid pressure to said outlet passage so that increase of pressure in said outlet passage will cause said other rigid washer to move towards said one rigid washer to cause said other washer to expand radially thereby decreasing the rate of flow between the outlet passage and the vent passages, said screw having a central bore therethrough coaxial with said valve port, a stud press fitted within said bore and having one end adjacent said valve port, a valve member adapted to sealingly fit within said valve port, stop means, screw means extending through said valve member and stop means, and threaded into said one end of said stud, said stop means located between said valve member and screw and including a plurality of arms extending radially from the axis of said valve stem, each arm including an end turned downwardly and projecting toward said valve port so as to engage said partition and limit movement of said valve member into said valve port, the space between said rubber washer and the cylindrical surfaces of said vent chamber comprising the only communication between said vent passages and said outlet passage.

References Cited in the file of this patent
UNITED STATES PATENTS

| | | |
|---|---|---|
| 99,649 | Davis | Feb. 2, 1870 |
| 574,768 | Walsh | Jan. 5, 1897 |
| 781,054 | Donahoe | Jan. 31, 1905 |
| 1,049,792 | Woods | Jan. 7, 1913 |
| 1,167,027 | Stephenson | Jan. 4, 1916 |
| 1,781,224 | Gilg | Nov. 11, 1930 |
| 3,024,801 | Carls | Mar. 13, 1962 |

FOREIGN PATENTS

| | | |
|---|---|---|
| 134,527 | Switzerland | Oct. 16, 1929 |
| 161,061 | Australia | Feb. 10, 1955 |